United States Patent [19]

Malarkey, Jr.

[11] 3,998,149

[45] Dec. 21, 1976

[54] FILTER BELT AND PRESS

[76] Inventor: Neil Malarkey, Jr., 6307 Franklin Road, Boise, Idaho 83705

[22] Filed: Feb. 10, 1975

[21] Appl. No.: 548,749

[52] U.S. Cl. .............................. 100/118; 210/400
[51] Int. Cl.² ................................. B30B 9/02
[58] Field of Search .......... 210/400, 401; 198/110, 198/16 MS; 100/118, 119, 120, 151–154; 162/367

[56] References Cited

UNITED STATES PATENTS

| | | | |
|---|---|---|---|
| 231,439 | 8/1880 | Mercier | 100/153 |
| 2,101,109 | 12/1937 | Thomson | 210/400 X |
| 2,122,376 | 6/1938 | Mason | 100/151 X |
| 3,115,439 | 12/1963 | Barrett | 162/367 |
| 3,230,866 | 1/1966 | Branders | 100/118 X |
| 3,325,859 | 6/1967 | Goldstein | 100/118 |
| 3,351,205 | 11/1967 | Butler et al. | 210/400 |
| 3,428,164 | 2/1969 | Lovegreen | 210/400 X |
| 3,446,139 | 5/1969 | Coffeld | 100/118 |
| 3,453,951 | 7/1969 | Malarkey, Jr. | 100/118 |
| 3,552,544 | 1/1971 | Palm | 198/110 |
| 3,648,598 | 3/1972 | Kawada | 100/118 |
| 3,687,295 | 8/1972 | Guyer | 100/118 |
| 3,770,126 | 11/1973 | Jacquelin | 210/400 |

Primary Examiner—Theodore A. Granger
Attorney, Agent, or Firm—Kolisch, Hartwell, Dickinson & Stuart

[57] ABSTRACT

A filter belt with multiple strip or wafer elements assembled side-by-side to extend as a row extending the length of the belt.

5 Claims, 6 Drawing Figures

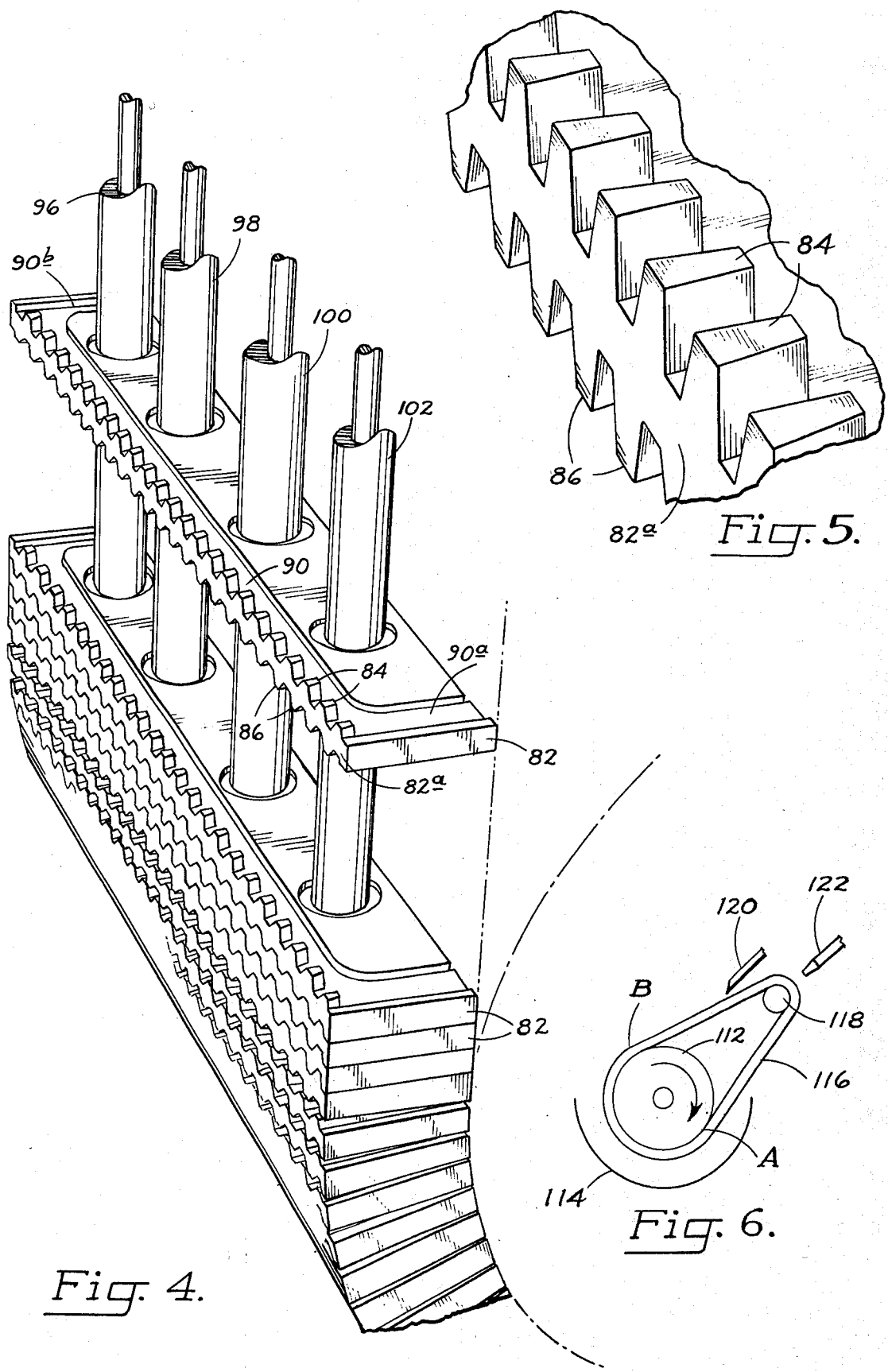

FILTER BELT AND PRESS

This invention relates to a filter belt, of the type that might be used in the extraction of fluid from a mixture of fluid and solids.

The filtering of a mixture containing solids suspended or otherwise carried in a fluid is a well-known material handling operation. Various forms of apparatus have been proposed for performing filtering in a continuous type of process. For instance, a drum may be employed which is circumferentially surfaced with a belt of filter material, organized so that the fluid and solid mixture is introduced against the surface of the drum with drawing of the fluid in the mixture through the filter belt surfacing the drum. In another type of apparatus, the filter belt may extend as an elongate reach between spaced pulleys or rolls supporting the belt, with provision made for introducing the fluid and solid mixture against the belt reach, with the fluid in the mixture moving through the belt to separate from the solids which are carried onwardly by the belt. Reference is made to my prior issued patent, U.S. Pat. No. 3,381,609, for the disclosure of various types of apparatus for the continuous separation of solids from a fluid mass containing the solids.

A difficulty which has been noted with conventional types of filter belts, which may be of a matted or woven construction, is the difficulty of ridding the belt of solid material after the step of separating the fluid and solids has occurred. Solid material tends to build up within the interstices of the belt to form a cake which isn't easily removed, even with reliance upon extensive backwashing of the belt. If the belt is of any thickness, solid material might be removable from the belt surface and from a region directly adjacent, but cleaning is rarely complete in region of the belt located any distance rearwardly from the face of the belt.

In addition to difficulties in cleaning, the usual cloth or fibrous belt of woven or matted construction tends to experience considerable wear, particularly if extensive efforts are made to clean the belt as the same travels about its course in the filtering process. Wear in the belt changes the filter characteristic of the belt.

A general object of the invention therefore, is to provide an improved filter belt having a construction which accommodates thorough cleaning after performing a filtering operation in the separation of solids from a fluid carrier.

Another object is to provide an improved filter belt, having improved resistance to wear after use for an extended period of time.

Yet a further object of the invention is to provide an improved filter belt which maintains the same filtering characteristics over an extended period of time, with respect to the size of the solid particles which are captured on the face of the belt and those particles which are permitted to flow through the belt to be part of the liquid extract produced in the filtration process.

A further object of the invention is to provide an improved filter belt which can be made in a variety of different lengths and widths utilizing a multiplicity of filter elements of a common size.

Yet another object is to provide an improved press featuring a belt of multiple filter elements.

These and various other objects and advantages will become more fully apparent from the following description taken in conjunction with the accompanying drawings, wherein:

FIG. 1 is a side elevation of a continuous filter press equipped with filter belts as contemplated by the instant invention;

FIGS. 2 and 3 are cross-sectional, perspective views, taken along the lines 2—2 and 3—3 of FIG. 1 respectively;

FIG. 4 is a perspective view illustrating in more detail particulars of the construction of the filter belt;

FIG. 5 is an enlarged perspective view of portions of a filter element; and

FIG. 6 is an illustration of a modified form of the invention.

Figure 1:
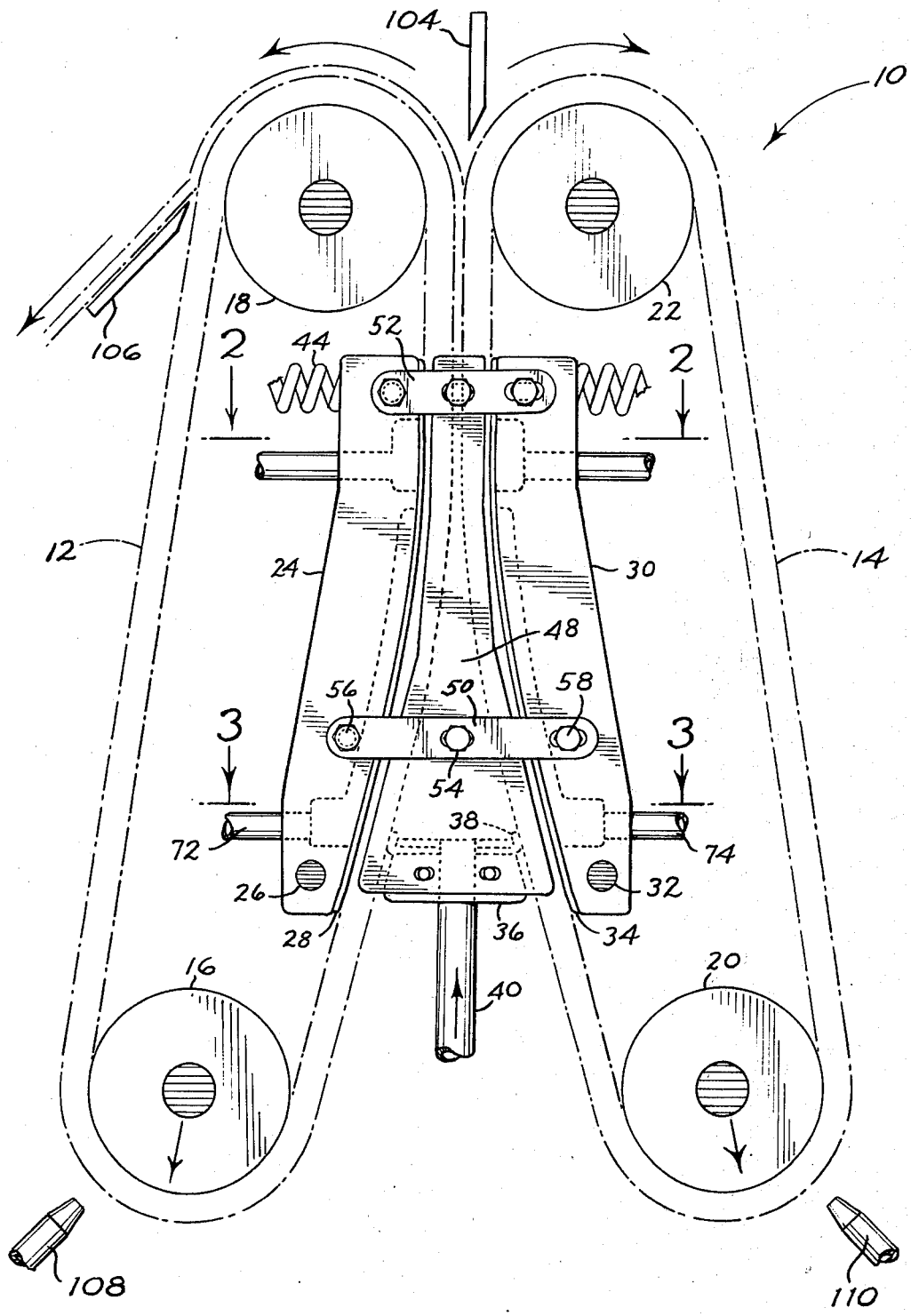

Referring now to the drawings, and first of all more particularly to FIG. 1, illustrated generally at 10 is a continuous filter press of the type that might be utilized in separating solids carried in a liquid, more particularly a fluid mixture containing the solids suspended therein, i.e., a slurry of the solids.

The press illustrated includes a pair of opposed continuous filter belts indicated at 12 and 14. Belt 12 is trained at lower and upper extremities about rolls or pulleys 16, 18. Similarly, belt 14 is trained at lower and upper extremities about rolls or pulleys 20, 22. A suitable frame in the press (eliminated from the drawings for reasons of simplicity) mounts the various rolls or pulleys with the latter being relatively rotatable on the frame.

Located between rolls 16 and 18, and backing up the rear or back face of reach 12a of belt 12, is a pressure platen 24. Such is mounted in a suitable manner within the press, as by the mounting bar shown at 26 which is mounted on the frame of the press and has platen 24 rockably mounted thereon, with the platen being pivotable about a horizontal axis extending transversely of the belt reach, such axis coinciding with the axis of bar 26. Platen 24 is surfaced with a wear strip such as shown at 28, which can be composed of a plastic material such as nylon or Teflon. Suitable means (not shown) is provided for moving under power either one or both of the rolls 16, 18 in a counterclockwise direction in FIG. 1, and with such movement of the rolls reach 12a moves upwardly across the wear strip which slidably engages the rear face of this belt reach.

A similar pressure platen 30 backs up reach 14a of belt 14, such being similarly mounted on a mounting bar 32 and being surfaced with a wear strip 34. Again, it is contemplated that one or both of the rolls 20, 22 be rotated under power, in a clockwise direction in this instance as shown in FIG. 1, and at the same speed as the rotation speed of rolls 16, 18, with such being effective to move reach 14a upwardly with such slidable over the wear strip 34.

Located between reaches 12a 14a of the filter belts, at approximately the elevation of bars 26, 32, is a closure member 36. The closure member extends across the full width of belt reaches 12a, 14a. A seal member 38 suitably mounted on the closure member provides a fluid seal between the belt reaches and adjacent margins of the closure member.

Member 36 is suitably mounted in a stationary position on the frame of the press. An infeed pipe 40 connects with the base of closure member 36. As probably best illustrated in FIG. 3, a chamber 42 in the closure member is in fluid communication with the interior of pipe 40. With operation of the press, the slurry which is to be processed is introduced into the press through this inlet pipe.

Above the closure member it will be noted that the reaches 12a, 14a of the filter belts converge on each other progressing upwardly in the press. The space bounded by these converging portions of reaches 12a, 14a, and the closure member described, constitutes a processing chamber in the press where separation of solids from the liquid occurs.

Suitable means is provided for biasing the upper extremities of pressure platens 24, 30 toward each other. This means may take the form of the spring construction 44 partially shown in FIG. 1, although obviously other constructions are possible, such as air operated cylinders, camming arrangements, etc. In this way, the filter belt reaches in a region adjacent the top of the pressure platens are urged closely adjacent each other, with provision for the belt reaches to move apart from each other to accommodate any cake which may have collected on the belt reaches.

A side plate, such as the one shown at 48, spans the margins of the filter belts 12, 14 and serves to bound one side of the processing chamber in the filter press. A similar side plate 49 (see FIG. 3) spans the margins of the filter belts on the side of the press away from the viewer in FIG. 1, and performs a similar function. These side plates may be provided with wear strips on their inner faces where the margins of the filter belts ride thereover. Side plate supports 50, 52 mount the side plates in position, with fasteners 54 securing these supports to the side plates, and fasteners 56, 58 securing the supports to the platens 24, 30. A limited amount of play is provided in the connection of the side plate supports with pressure platen 30, through fasteners 58, to accommodate relative movement of the opposed pressure plates.

Figure 3:
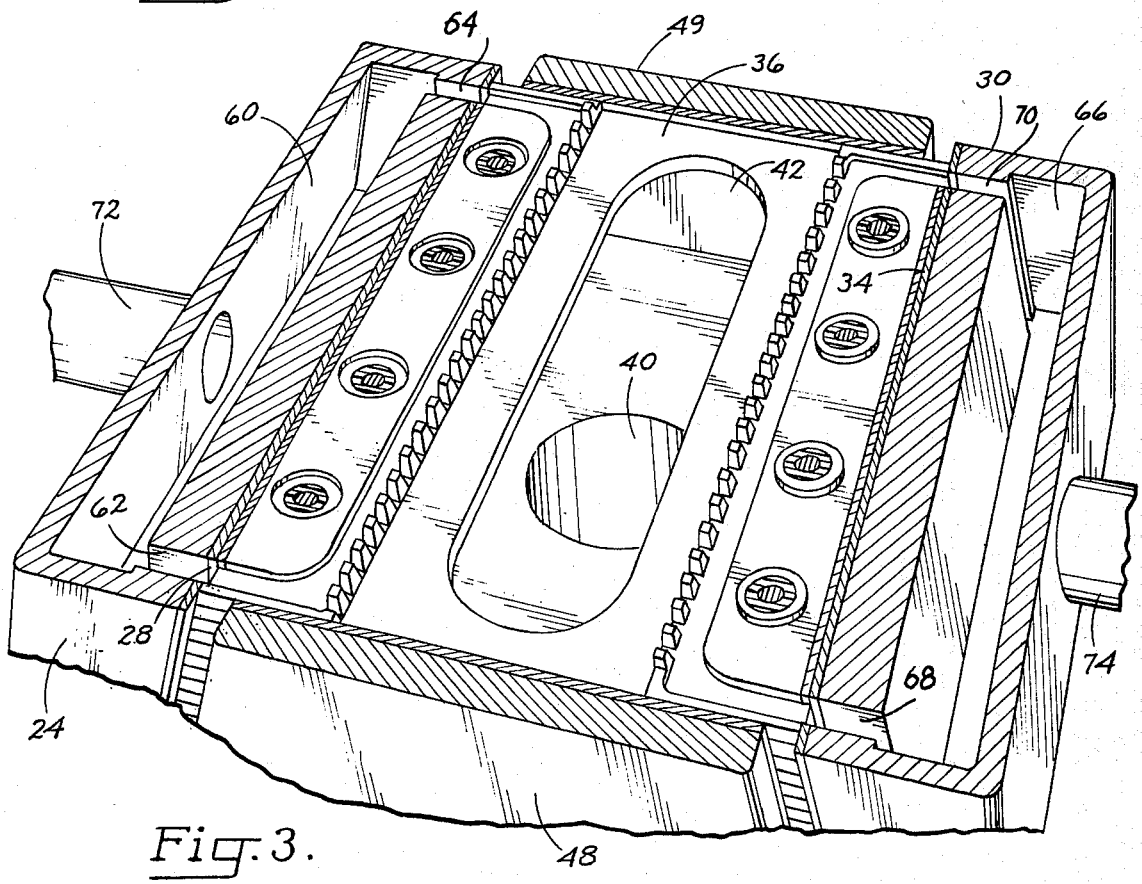

As can be seen in FIG. 3, pressure platen 24 is provided with an internal collection chamber 60, and passages 62, 64 connect this chamber with the back of filter belt reach 12a in regions adjacent opposite side margins of this reach. A similar collection chamber 66 and passages 68, 70 are provided in pressure platen 30. During operation of the press, the liquid which is separated from the solid material by passage through the filter belts flows into these chambers thence to be discharged from the press through outlet pipes 72, 74 communicating with chambers 60, 66, respectively.

Figure 2:
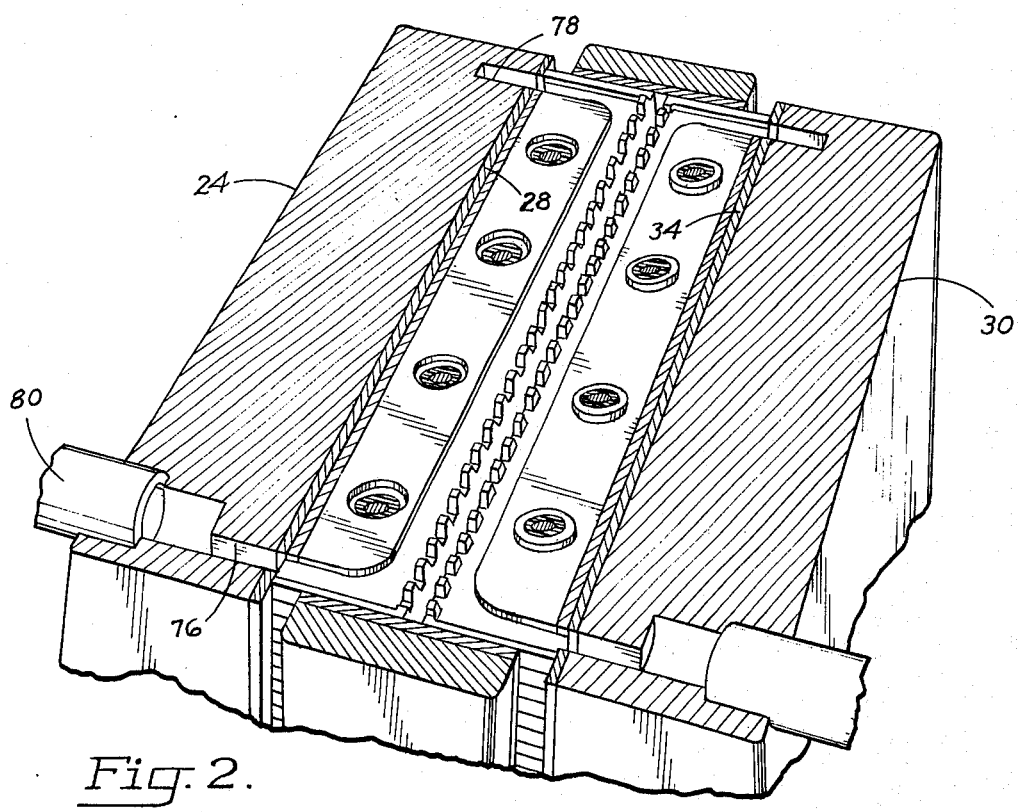

If desired, a vacuum system may be provided adjacent the top of the press further to promote complete removal of liquid material. Thus, and with reference to FIG. 2, adjacent the top extremities of the pressure platens, each platen may be provided with passages, such as those shown at 76, 78 in connection with platen 24, communicating with the back of the filter belt in side marginal regions. Passage 78 communicates with the atmosphere, and passage 76 connects with a pipe 80 leading to a vacuum pump. The vacuum draws air and the liquid remaining in the filter belt outwardly of the press through the pipe 80.

Details of a filter belt as contemplated are perhaps best illustrated in FIG. 4.

Referring to this figure, the filter belt, as shown, comprises multiple wafer or filter elements assembled side by side to extend as a row along the length of the belt. More particularly, each wafer element takes the form of an elongate strip 82, with such strips stacked side by side. A set of edges in the strips, i.e., the left hand edges in FIG. 4, collectively form the front filtering face of the belt.

Each of the strips or wafer elements is preferably made of a hard material, such as a hard plastic material. For instance, it has been found convenient to form the strips of molded hard urethane rubber.

With continued reference to FIG. 4, each strip 82 adjacent the edge 82a which forms part of the front filtering face of the filter belt is provided with a row of teeth 84 extending along the top margin of the strip, and another row of teeth 86 extending along the bottom margin of the strip. Considering any adjacent pair of strips or wafer elements, the teeth 84 along the margin of the lower element interlock with the teeth 86 along the bottom margin of the upper element.

A slight clearance is provided between the teeth, as by shaping teeth 86 so that they do not fully seat within the recesses provided between teeth 84, and this clearance provides passages, also referred to as an escape passage means, in the filter belt through which liquid may be expelled through the belt. It should also be noted that the cooperating teeth are undercut (see FIG. 5), in that the width and height of each tooth decreases slightly progressing rearwardly from the frnt face of the belt. In this way, any particle which manages to travel through the clearance provided between cooperating teeth is provided with an increasing larger passage as it works its way rearwardly in the belt from the front face.

Each wafer element or strip, along top and bottom faces, is provided with an elongate course, such as that shown at 90. The course extends from the rear edge of each element as at 90a, forwardly to adjacent the back of a row of teeth, thence in a mid expanse along the length of the element, and thence toward the rear of the element at the opposite end of the element, as at 90b. Each course communicates along its mid expanse, with the various passages provided between cooperating teeth by the clearance described between cooperating teeth. Portions 90a, 90b of each course register with passages 62, 64 in the pressure platens, thus to enable the flow of liquid expelled through the teeth into the chambers exemplified by chamber 60 and thence out an outlet pipe. The mid expanses of said courses form what is also referred to as a first channel means, and said portions 90a, 90b, constitute a second channel means communicating with said first channel means and constructed and arranged to discharge fluid from the back face of the belt.

The various wafer elements are held together in the assembled state in the belt by continuous cables or strands, as exemplified by the strands shown at 96, 98, 100 and 102. These pass through accommodating bores provided in the wafer elements which make up the belt. The strands typically might comprise a center cable coated with plastic to inhibit wearing of the wafer elements during use of the filter belt.

Each wafer element may further be provided on one side thereof, with annular recesses encircling the bores that receive strands 96, as shown in FIG. 4. The opposite sides of the wafer elements may be provided with annular bosses encircling these bores, which bosses fit within the annular recesses of an adjacent wafer element.

It will be noted, and with reference to FIG. 4, that when a belt as constructed passes around a pulley or drum, there is a tendency for the edges of the wafer elements which form the front face of the belt to spread apart from each other slightly, to accommodate the curvature of the roll. This spreading apart of the wafer elements can be utilized in cleaning the belt as by directing a stream or streams of water against the elements when they are in this spread apart condition.

A belt may be made of wafer elements stacked as shown in FIG. 4. Alternatively, the belt can be made in brick wall fashion, i.e., with multiple wafer elements extending transversely of the belt at each level and with the elements at one level staggered with respect to the elements of another. Thus, various widths of filter belts may be prepared using wafer elements of a common size.

Referring to FIG. 1, the solid material which is expressed from the press at the top of the press in the figure may be removed from the belts using blades 104, 106. Cleaning the belts, by expressing jets of water against the wafer elements where they are spread about as they curve about a roll, are water jet sprays 108, 110.

Illustrated in FIG. 6 is a modified form of the invention. In the press illustrated a drum 112 is provided equipped with means for evacuating the interior of the drum from the region indicated at A extending in a clockwise direction to the region indicated at B. A tank for holding a slurry to be processed is shown at 114. A filter belt 116 encompasses the vacuum drum as well as a drum 118 which is spaced from the vacuum drum. A doctor blade 120 removes the solid material from the outer face of the belt as the upper reach of the belt travels from drum 112 toward drum 118. A water spray cleaning system is shown at 122, for cleaning the wafer elements as they move about the drum 118.

It will be seen from the above description that a novel filter belt has been described which possesses a number of unique features. Thus, the belt comprises a multiplicity of wafer elements which when stacked tightly together provide between them minute passages for the travel of the filtrate during the filtering operation. A belt is readily cleaned by the use of water sprays or other equipment preferably during the time that the wafer elements tend to move apart as when moving over the surface of a roll or drum. The belt withstands wear to a high degree and during the life of the belt the filtering characteristic of a belt is substantially uniform. The belt construction is such as to resist clogging of interstices therein such as would impair operation of the belt.

While embodiments of the invention have been described, it should be obvious that variations and alterations are possible without departing from the invention.

It is claimed and desired to secure by Letters Patent:

1. An endless filter belt with a front filtering face and an opposite back face comprising multiple strip elements assembled to extend in a row extending the length of the belt, said strip elements extending transversely of said row,
   registering apertures in said strip elements extending through the elements,
   at least one elongate continuous strand extending through said apertures and constructed and arranged to flexibly support the strip elements, the strip elements further comprising first fluid channel means between adjacent elements recessed into at least one of said elements and extending the length thereof, escape passage means between adjacent elements in fluid communication with the front face of the belt and providing a path for the flow of fluid from the front face of the belt into said first channel means, and second fluid channel means located at each set of ends of adjacent elements in fluid communication with said first channel means and constructed and arranged to discharge fluid from said opposite back face.

2. The endless filter belt of claim 1, wherein said adjacent strip elements have margins extending along their length adjacent the front face of the belt formed with intermeshing teeth, and said escape passage means is defined between said teeth.

3. The filter belt of claim 2, wherein said escape passage means is constructed and arranged to have an increasingly larger size progressing from said front face to said first fluid channel means.

4. A filter press comprising
   an elongate endless filter belt having a front filtering face and an opposite back face, and means mounting the belt including spaced rolls training the belt with the reach of the belt traveling between said rolls,
   means forming a processing chamber with said front face and said reach of the belt where a fluid mixture to be filtered is compressed including an inlet for the supply of fluid mixture to the processing chamber,
   said belt comprising multiple strip elements assembled to extend in a row extending the length of the belt, said strip elements extending transversely of said row, registering apertures in said strip elements extending through the elements, at least one elongate continuous strand extending through said apertures and constructed and arranged to flexibly support the strip elements, the strip elements further comprising first fluid channel means between adjacent elements recessed into at least one of said elements and extending the length thereof, escape passage means between adjacent elements in fluid communication with the front face of the belt and providing a path for the flow of fluid from said front face to said first channel means, second fluid channel means located at each set of ends of adjacent elements in fluid communication with said first channel means and constructed and arranged to discharge fluid from said opposite back face,
   said press further including a collection chamber adjacent said back face of the belt for collecting fluid discharged from said back face.

5. The filter press of claim 4, which further comprises means for directing a washing fluid against the front face of the belt where said belt travels over at least one of the rolls training the belt.

* * * * *